United States Patent
Yoshida et al.

(10) Patent No.: US 10,209,091 B2
(45) Date of Patent: Feb. 19, 2019

(54) MEASUREMENT TOOL, CALIBRATION METHOD, CALIBRATION APPARATUS, AND COMPUTER-READABLE RECORDING MEDIUM

(71) Applicants: Katsunobu Yoshida, Kanagawa (JP); Shin Aoki, Kanagawa (JP)

(72) Inventors: Katsunobu Yoshida, Kanagawa (JP); Shin Aoki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/661,101

(22) Filed: Jul. 27, 2017

(65) Prior Publication Data

US 2017/0322048 A1 Nov. 9, 2017

Related U.S. Application Data

(63) Continuation of application No. PCT/JP2016/051755, filed on Jan. 21, 2016.

(30) Foreign Application Priority Data

Feb. 13, 2015 (JP) .................................. 2015-026898

(51) Int. Cl.
*G01C 25/00* (2006.01)
*G06T 7/00* (2017.01)
(Continued)

(52) U.S. Cl.
CPC .............. *G01C 25/00* (2013.01); *G01C 3/00* (2013.01); *G01C 3/06* (2013.01); *G01C 3/08* (2013.01);
(Continued)

(58) Field of Classification Search
CPC .................................. G01C 25/00; G06T 7/85
USPC .......................................................... 348/46
See application file for complete search history.

(56) References Cited

U.S. PATENT DOCUMENTS

| 2010/0283837 A1 | 11/2010 | Oohchida et al. |
| 2013/0250065 A1 | 9/2013 | Aoki et al. |

(Continued)

FOREIGN PATENT DOCUMENTS

| JP | 09-113356 | 5/1997 |
| JP | 2000-088524 | 3/2000 |

(Continued)

OTHER PUBLICATIONS

International Search Report dated Apr. 19, 2016 in PCT/JP2016/051755 filed Jan. 21, 2016 (with English Translation).

(Continued)

*Primary Examiner* — Jeffery A Williams
(74) *Attorney, Agent, or Firm* — Oblon, McClelland, Maier & Neustadt, L.L.P.

(57) ABSTRACT

A measurement tool includes a first member and a measurement member. The first member has a surface including a chart to be used for calibration of a stereo camera. The measurement member is arranged on the surface of the first member. The measurement member includes a light source and a second member. The light source is configured to emit light with a uniform intensity regardless of a position on the surface. The second member is configured to cover the light source and radiate the light from a plurality of first holes and a plurality of second holes having a size larger than the first hole.

8 Claims, 21 Drawing Sheets

(51) Int. Cl.
*G01C 3/00* (2006.01)
*G01C 3/06* (2006.01)
*H04N 13/128* (2018.01)
*H04N 13/246* (2018.01)
*H04N 13/254* (2018.01)
*G01C 3/08* (2006.01)
*G06T 7/80* (2017.01)
*H04N 13/271* (2018.01)
*H04N 13/239* (2018.01)
*H04N 13/00* (2018.01)

(52) U.S. Cl.
CPC .............. *G06T 7/85* (2017.01); *H04N 13/128* (2018.05); *H04N 13/239* (2018.05); *H04N 13/246* (2018.05); *H04N 13/254* (2018.05); *H04N 13/271* (2018.05); *G06T 2207/30208* (2013.01); *G06T 2207/30252* (2013.01); *H04N 2013/0081* (2013.01)

(56) References Cited

U.S. PATENT DOCUMENTS

2014/0125819 A1* 5/2014 Tokunaga ................ G06T 7/85
    348/188
2016/0353083 A1   12/2016 Aoki et al.

FOREIGN PATENT DOCUMENTS

JP   2004-132870   4/2004
JP   2011-112401   6/2011
JP   2016-006406   1/2016

OTHER PUBLICATIONS

Written Opinion dated Apr. 19, 2016 in PCT/JP2016/051755 filed Jan. 21, 2016.

* cited by examiner

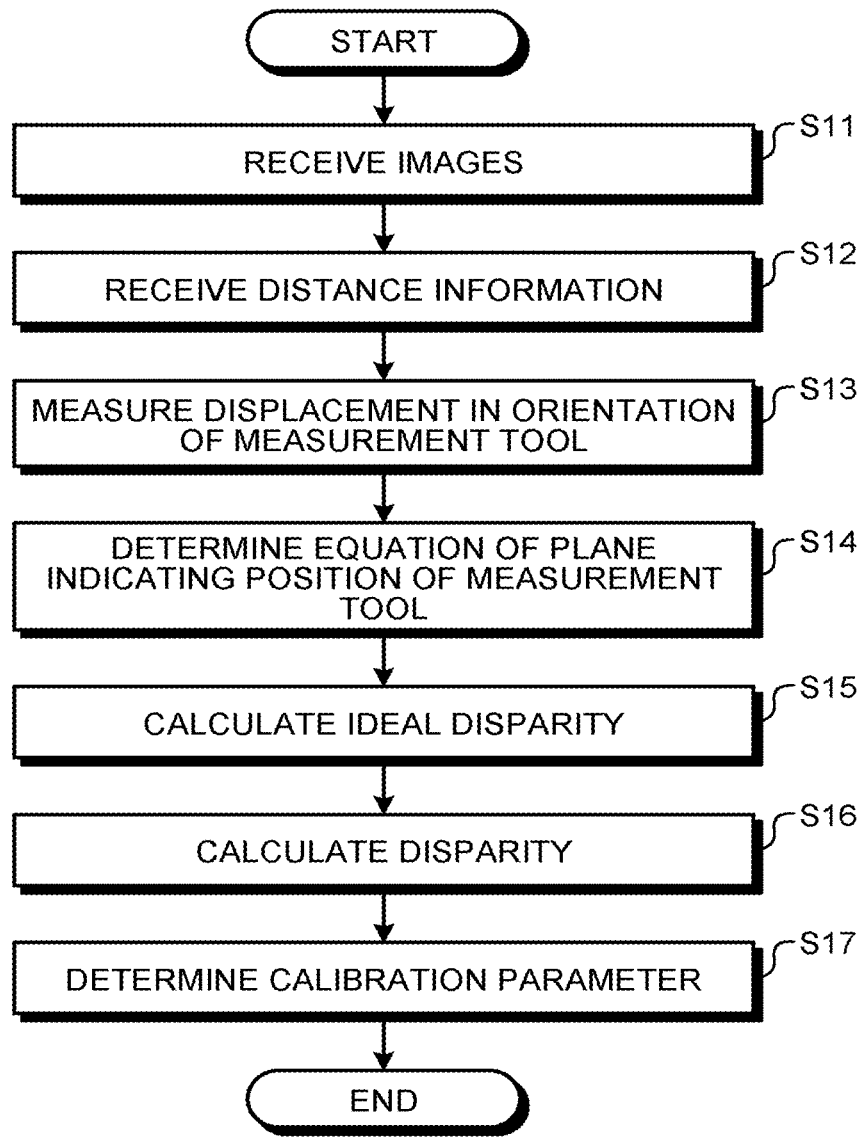

MEASUREMENT TOOL, CALIBRATION METHOD, CALIBRATION APPARATUS, AND COMPUTER-READABLE RECORDING MEDIUM

CROSS-REFERENCE TO RELATED APPLICATIONS

The present application is a continuation application of International Application No. PCT/JP2016/051755, filed Jan. 21, 2016, which claims priority to Japanese Patent Application No. 2015-026898, filed Feb. 13, 2015. The contents of these applications are incorporated herein by reference in their entirety.

BACKGROUND OF THE INVENTION

1. Field of the Invention

The present invention relates to a measurement tool, a calibration method, a calibration apparatus, and a computer-readable recording medium.

2. Description of the Related Art

A stereo camera capable of measuring a distance to a subject has been utilized. For example, a technique of measuring a distance to a subject in front of an automobile by a stereo camera equipped in an automobile (hereinafter referred to as "in-vehicle stereo camera") and controlling the automobile has been put into practical use. The distance measured by the in-vehicle stereo camera is used to alert a driver and control a brake, a steering, and the like for the purpose of preventing a collision of an automobile, controlling a distance between automobiles, and the like. Besides, a technique of calibrating a stereo camera equipped in a moving body such as an automobile has been known.

For example, Japanese Unexamined Patent Application Publication No. 2004-132870 discloses an invention of adjusting an optical distortion and a positional displacement of a stereo camera by performing image processing on image data obtained by capturing an image of a chart having a predetermined pattern.

However, it is difficult in the conventional technique to accurately measure a displacement in relative position between a chart and a stereo camera and to calibrate the stereo camera by accurately taking the displacement in relative position into consideration.

SUMMARY OF THE INVENTION

According to one aspect of the present invention, a measurement tool includes a first member and a measurement member. The first member has a surface including a chart to be used for calibration of a stereo camera. The measurement member is arranged on the surface of the first member. The measurement member includes a light source and a second member. The light source is configured to emit light with a uniform intensity regardless of a position on the surface. The second member is configured to cover the light source and radiate the light from a plurality of first holes and a plurality of second holes having a size larger than the first hole.

BRIEF DESCRIPTION OF THE DRAWINGS

FIG. 18 is a flowchart of an example of the calibration method according to the first embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
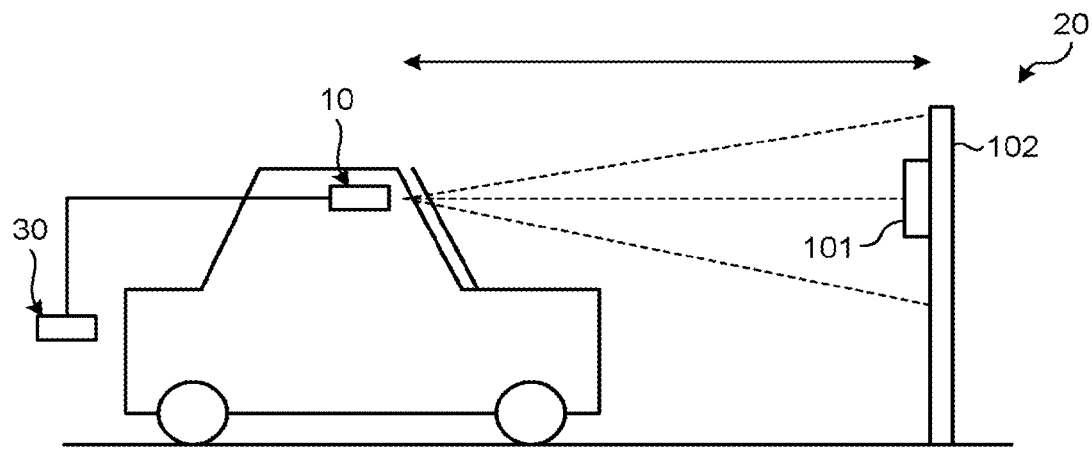
FIG. 1 illustrates an example of a relation of a measurement tool, a stereo camera, and a calibration apparatus according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide a measurement tool, a calibration method, a calibration apparatus, and a computer-readable recording medium which are capable of calibrating a stereo camera with higher accuracy.

First Embodiment

FIG. 1 illustrates an example of a relation of a measurement tool 20, a stereo camera 10, and a calibration apparatus 30 according to a first embodiment. FIG. 1 illustrates an example of calibrating an image captured by the stereo camera 10 (in-vehicle stereo camera) attached in an inside of a windshield of an automobile.

The stereo camera 10 captures an image of a subject in front of an automobile and measures a distance to the subject.

The measurement tool 20 is used to obtain measurement data that enables determining a calibration parameter used for calibrating the stereo camera 10. The measurement tool 20 is arranged in a manner of falling within an imaging range of the stereo camera 10. For example, the measurement tool 20 is arranged at a distance of approximately two meters away from the stereo camera 10 in a manner of nearly facing the stereo camera 10. The measurement tool 20 according to the first embodiment is provided with an angular measurement plate 101 and a first member 102. The angular measurement plate 101 is used to measure an angle indicating a displacement of the measurement tool 20 inclined in the horizontal direction and an angle indicating a displacement of the measurement tool 20 inclined in the vertical direction. The first member 102 is used as a chart that allows calibrating the stereo camera 10.

The calibration apparatus 30 is a computer that determines a calibration parameter from measurement data obtained by using the measurement tool 20.

Next, a functional configuration of the stereo camera 10 according to the first embodiment will be explained.

Figure 2:
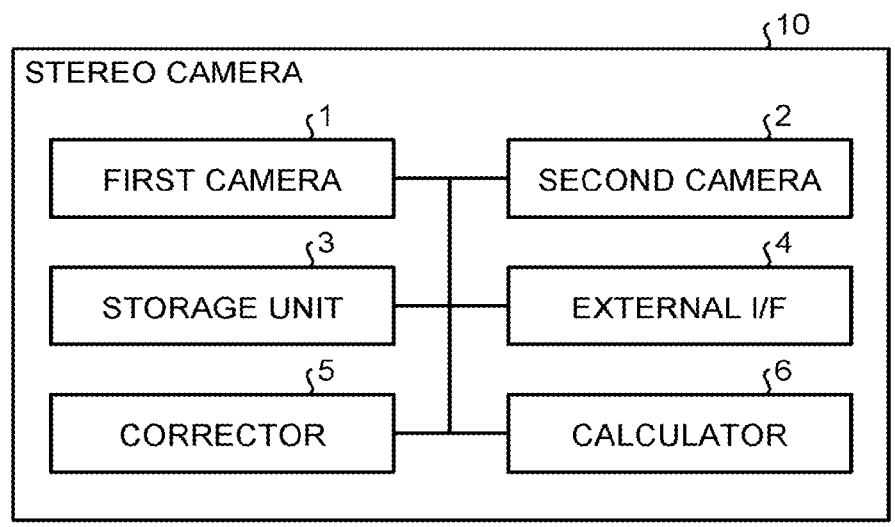
FIG. 2 is illustrates an example of a functional configuration of the stereo camera according to the first embodiment.

FIG. 2 is illustrates an example of a functional configuration of the stereo camera 10 according to the first embodiment. The stereo camera 10 according to the first embodiment is provided with a first camera 1, a second camera 2, a storage unit 3, an external I/F 4, a corrector 5, and a calculator 6. The first camera 1 captures an image of a subject to obtain a first image. The second camera 2 captures an image of the subject to obtain a second image. The first camera 1 and the second camera 2 are arranged in parallel so that respective optical axes become parallel. The image-capturing timings of the first camera 1 and the second camera 2 are synchronized and both capture respective images of the same subject at the same time.

The storage unit 3 stores the first image, the second image, and the calibration parameter. The calibration parameter is used in correcting a displacement, attributed to an assembly tolerance of the stereo camera 10, a windshield, and the like, in the first image and the second image. The calibration parameter is determined in a calibration method according to the present embodiment. The external I/F 4 is an interface that allows inputting and outputting data to and from the storage unit 3. The calibration parameter to be used in the stereo camera 10 is determined in the calibration method according to the present embodiment and stored in the storage unit 3 by using the external I/F 4.

The corrector 5 reads out the first image, the second image, and the calibration parameter from the storage unit 3. The corrector 5 corrects the first image and the second image by an image correction formula depending on the calibration parameter. The image correction formula corrects the first image (the second image) through a transformation of coordinates of the first image (the second image). For example, since the image correction formula can be expressed by a matrix in a case of correcting the coordinates of the first image (the second image) via an affine transformation, the calibration parameter is a component of the matrix. Besides, in a case of correcting the coordinates of the first image (the second image) via a non-linear transformation, the calibration parameter is a coefficient in a polynomial expression expressing the transformation. The corrector 5 may be configured to correct one of the first image and the second image. In other words, based on one of the images, the image correction formula may correct the other one of the images. The corrector 5 inputs the corrected first image and the corrected second image to the calculator 6.

The calculator 6 calculates a disparity for each subject based on the corrected first image and the corrected second image. Here, a disparity and a distance measurement principle using the disparity will be explained.

Figure 3:
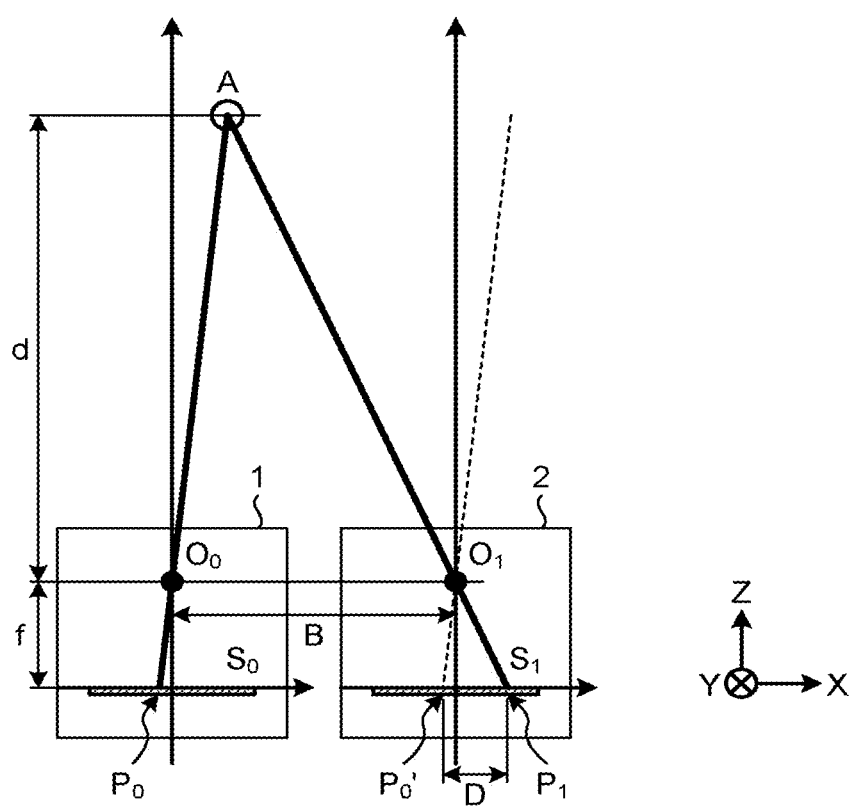
FIG. 3 is an explanatory view of a principle of a measurement, by using a stereo camera, of a distance.

FIG. 3 is an explanatory view of a principle of a measurement, by using the stereo camera 10, of a distance. In the example of FIG. 3, the first camera 1 (whose focal length is f, optical center is $O_0$, and imaging surface is $S_0$) is arranged so that Z axis is set as the direction of its optical axis. The second camera 2 (whose focal length is f, optical center is $O_1$, and imaging surface is $S_1$) is arranged so that Z axis is set as the direction of its optical axis. The first camera 1 and the second camera 2 are arranged at a position of a distance B (baseline length) away from each other in parallel with X axis. The coordinate system in FIG. 3 will be referred to as "camera coordinate system" below. Besides, a coordinate system based on the optical center of the first camera 1 will be referred to as "first camera coordinate system". A coordinate system based on the optical center of the second camera 2 will be referred to as "second camera coordinate system".

An image of a subject A which is located at a position of a distance d away from the optical center $O_0$ of the first camera 1 to the optical axis direction is formed at a position $P_0$ which is a point of intersection of a straight line A-$O_0$ and the imaging surface $S_0$. In the second camera 2, an image of the same subject A is formed at a position $P_1$ on the imaging surface $S_1$.

Here, an intersection of a straight line which passes through the optical center $O_1$ of the second camera 2 and is parallel with the straight line A-$O_0$ and the imaging surface $S_1$ is set as $P_0'$. Besides, a distance between $P_0'$ and $P_1$ is set as D. The distance D indicates an amount of displacement (disparity) in position on images, captured by the two cameras, of the same subject. A triangle A-$O_0$-$O_1$ and a triangle $O_1$-$P_0'$-$P_1$ are similar. Therefore, the following Equation (1) is satisfied.

$$d = \frac{Bf}{D} \quad (1)$$

Specifically, the distance d to the subject A can be calculated based on the baseline length B, the focal length f, and the disparity D. Here, when the first camera 1 and the second camera 2 are accurately arranged, the distance d (distance between the optical center $O_0$ of the first camera 1 and the subject A in the optical axis direction) calculated in the first camera coordinate system corresponds to the distance d (distance between the optical center $O_1$ of the second camera 2 and the subject A in the optical axis direction) calculated in the second camera coordinate system.

What has been explained so far is the principle of the distance measurement by the stereo camera 10. To accurately calculate the distance d to the subject A, it is necessary that the first camera 1 and the second camera 2 are arranged accurately. However, there is a possibility that the first camera 1 (the second camera 2) is displaced in position to a direction of rotating around each of the X axis, the Y axis, or the Z axis. Coordinates of the first image (the second image) are accordingly displaced approximately from side to side and up and down. Moreover, in the case of the in-vehicle stereo camera that captures an image of the subject via the windshield, there arises a distortion in the first image (the second image) due to an influence of the windshield. The stereo camera 10 uses the calibration parameter to correct an error of the disparity attributed to the displacement in the first image (the second image) due to the assembly tolerance of the two cameras and the distortion in the first image (the second image) due to the windshield and corrects the first image (the second image) by a signal processing.

Referring back to FIG. 2, the calculator 6 generates a parallax image expressing a disparity for each pixel based on a density value of pixels of the image (the first image or the second image) on which the calculation of the disparity is based. The calculator 6 also calculates the distance to the subject by using the parallax image and Equation (1).

Next, a structure of the measurement tool 20 according to the first embodiment will be explained.

Figure 4:
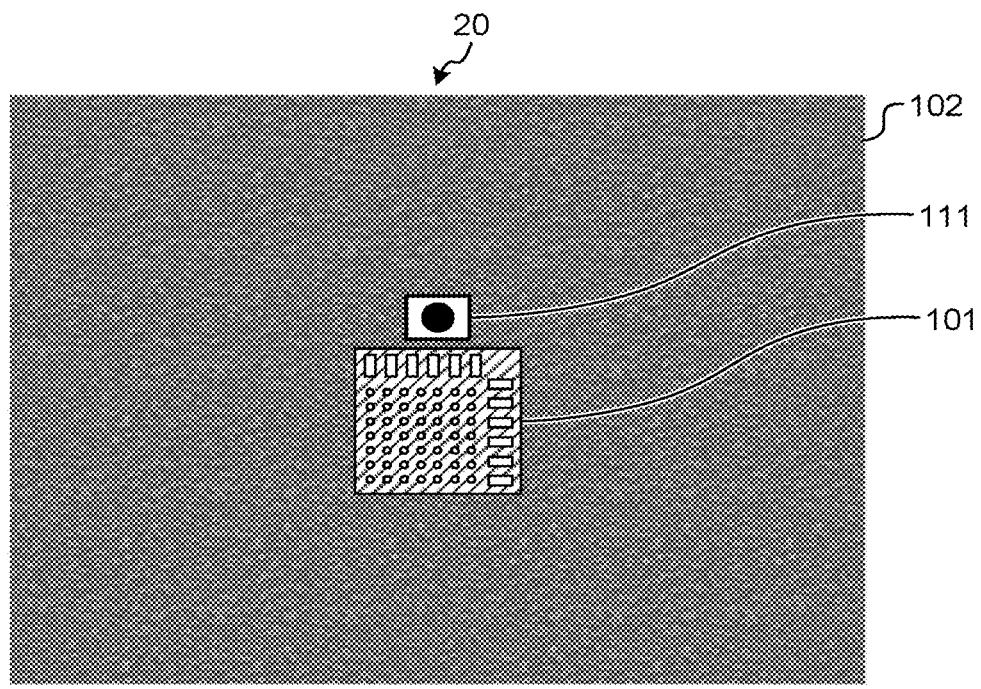
FIG. 4 is a front view illustrating a front face of the measurement tool according to the first embodiment.

FIG. 4 is a front view illustrating a front face of the measurement tool 20 according to the first embodiment. The measurement tool 20 according to the first embodiment is provided with the angular measurement plate 101 and the first member 102. The angular measurement plate 101 is arranged at a center of a surface of the first member 102. The first member 102 includes a mark 111 at an upper part of the angular measurement plate 101. The mark 111 is used as a reference mark for calculating a distance between the first member 102 (the measurement tool 20) and the stereo camera 10 (the first camera 1) as a calibration target. The front surface of the first member 102 has a shading pattern that enables easily detecting a point, corresponding to a point on the first image, on the second image.

Next, a structure of the angular measurement plate 101 according to the first embodiment will be explained.

Figure 5A:
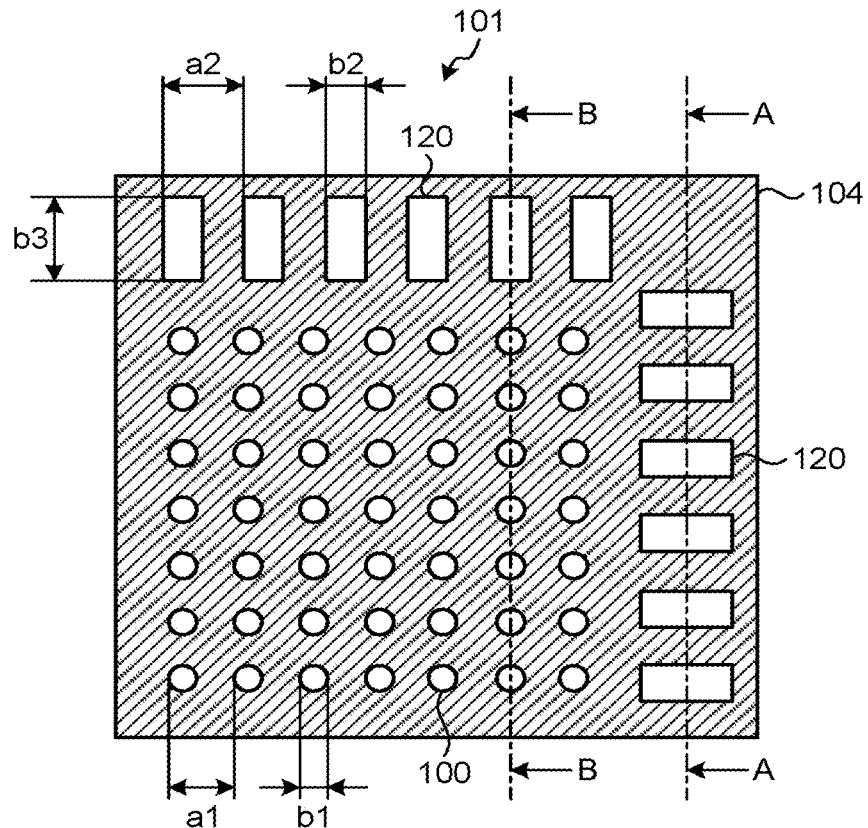
FIG. 5A is a front view illustrating a front face of an angular measurement plate according to the first embodiment.
Figure 5B:
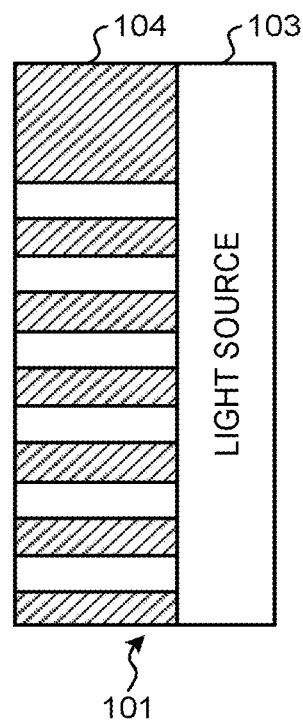
FIG. 5B is a cross sectional view taken along line A-A of the angular measurement plate according to the first embodiment.
Figure 5C:
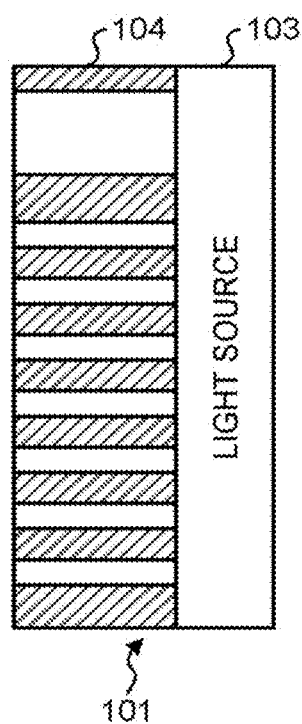
FIG. 5C is a cross sectional view taken along line B-B of the angular measurement plate according to the first embodiment.

FIG. 5A is a front view illustrating a front face of the angular measurement plate 101 according to the first embodiment. FIG. 5B is a cross sectional view taken along line A-A of the angular measurement plate 101 according to the first embodiment. FIG. 5C is a cross sectional view along line B-B of the angular measurement plate 101 according to the first embodiment.

The angular measurement plate 101 (measurement member) includes a light source 103 and a second member 104. The light source 103 is a planate diffused light source which has a uniform brightness distribution. In other words, the light source 103 emits light with a uniform intensity regardless of the position on the surface of the first member 102 (a light whose difference in intensity depending on the position on the surface falls within a predetermined range).

The second member 104 is arranged in a manner of covering the light source 103 and emits the light of the light source 103 from a plurality of first holes 100 and a plurality of second holes 120. Each of the first holes 100 is bored to a direction perpendicular to the surface of the first member 102. The first holes 100 are provided at first intervals a1 in a manner of being aligned longitudinally and laterally. The first hole 100 has a circular shape whose diameter is b1. Besides, each of the second holes 120 is bored to a direction perpendicular to the surface of the first member 102. The second holes 120 are provided at second intervals a2 (a2>a1) at an upper end part and a left end part of the second member 104. The second hole 120 has a rectangular shape whose size is b2×b3 (b2>b1).

Here, the number, the shape, and the alignment manner of the first holes 100 and the second holes 120 are not limited to the configuration illustrated in FIG. 5A and may be arbitrarily set. For example, the second holes 120 may be provided at a lower end part and a right end part of the second member 104. Besides, the material of the second member 104 may be arbitrarily set. The second member 104 is formed of a metal, for example.

The light source 103 may not necessarily be arranged on the surface of the first member 102 as long as the light source 103 is located at a position from which the light thereof can be radiated from the first holes 100 and the second holes 120 of the second member 104.

As for the first holes 100, an individual reference number will be used in referring to the first hole 100 at a specific position. Similarly, as for the second holes 120, an individual reference number will be used in referring to the second hole 120 at a specific position.

Next, an intended purpose of the first holes 100 will be explained.

Figure 6:
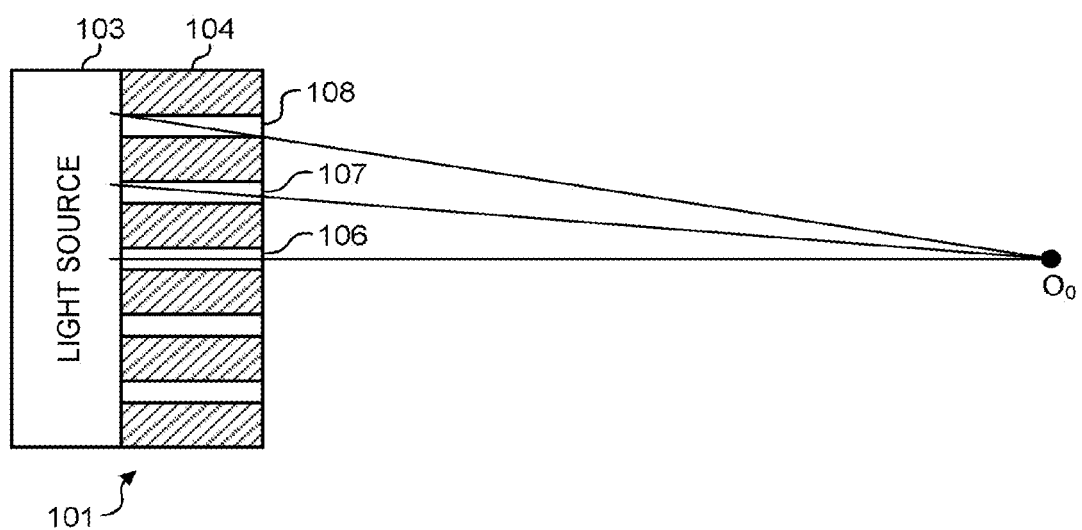
FIG. 6 is an explanatory view of a case where first holes 106, 107, and 108 bored in the second member are seen from a position at an optical center of the first camera.
Figure 7A:
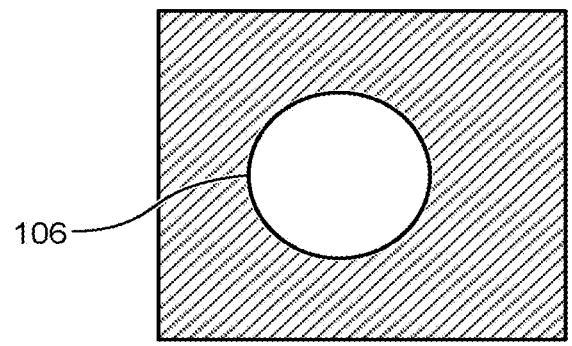
FIG. 7A illustrates a shape of the first hole 106 when the first hole 106 is seen from the position at the optical center of the first camera.
Figure 7B:
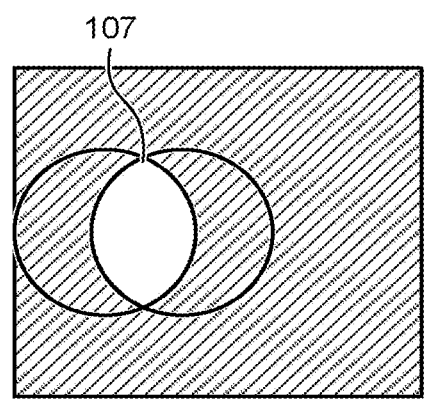
FIG. 7B illustrates a shape of the first hole 107 when the first hole 107 is seen from the position at the optical center of the first camera.
Figure 7C:
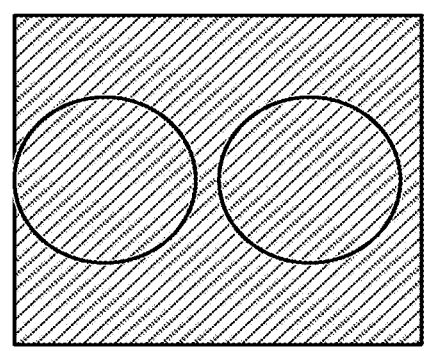
FIG. 7C illustrates a shape of the first hole 108 when the first hole 108 is seen from the position at the optical center of the first camera.

FIG. 6 is an explanatory view of a case where first holes 106, 107, and 108 bored in the second member 104 are seen from the position at the optical center $O_0$ of the first camera 1. Since a line of sight from the position at the optical center $O_0$ and the surface of the second member 104 are at right angles to each other at the position of the first hole 106, the light of the light source 103 behind the second member 104 is seen in a shape illustrated in FIG. 7A. Since the line of sight from the position at the optical center $O_0$ goes into the first hole 107 of the second member 104 at an angle at the position of the first hole 107, the light of the light source 103 behind the second member 104 is seen in a shape illustrated in FIG. 7B. Since the line of sight from the position at the optical center $O_0$ does not go into the first hole 108 of the second member 104 at the position of the first hole 108, the light of the light source 103 behind the second member 104 comes to be invisible (FIG. 7C).

Referring back to FIG. 5A, when an image of the angular measurement plate 101 (the second member 104) is captured by the first camera 1 having a high resolution enough for the first interval a1 of the first holes 100, an area of the figure of the first hole 100 in the vicinity of the location where the line of sight from the optical center $O_0$ of the first camera 1 and the surface of the second member 104 are at right angles comes out in large size. As the first hole 100 becomes farther apart from the location where the line of sight from the optical center $O_0$ of the first camera 1 and the surface of the second member 104 are at right angles, the area of the figure of the first hole 100 comes to be more partial and the figure of the first hole 100 does not come out at a position far enough.

Here, the first interval a1 of the first holes 100 of the second member 104 will be explained. The first interval a1 of the first holes 100 in FIG. 5A is set to be narrower than a resolution limit of the stereo camera 10 (the first camera 1). For example, under a condition that the (semi) viewing angle is 20 degrees, an imaging distance (correction distance) is two meters, and a pixel sensor has 640×480 pixels, the first interval a1, when being equal to or less than 2 millimeters, becomes smaller than the pixel pitch based on the following Expression (2).

$$\tan(20[\deg])\times 2000/320 \approx 2.3 \qquad (2)$$

Figure 8:
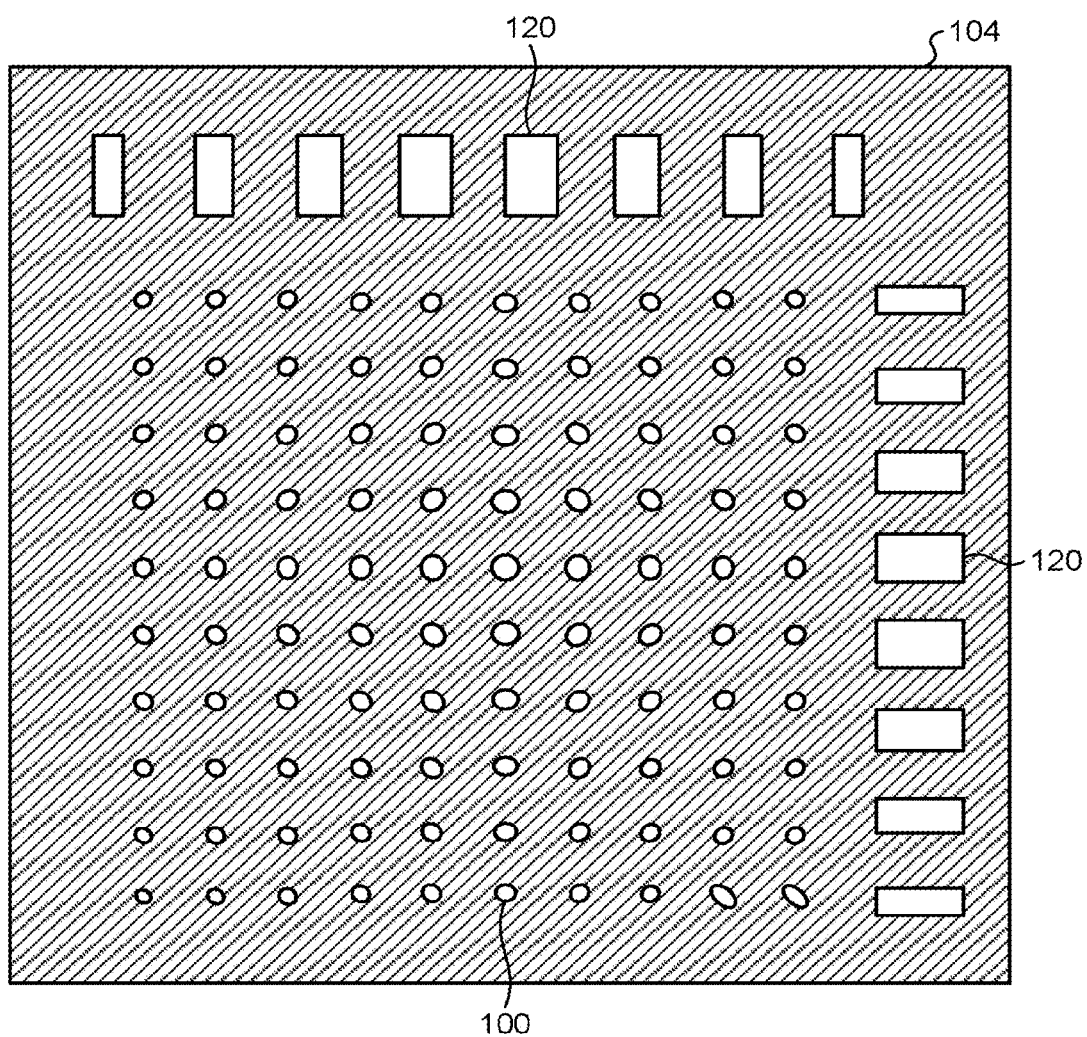
FIG. 8 illustrates figures of the angular measurement plate in a case of not including an optical blur.
Figure 9:
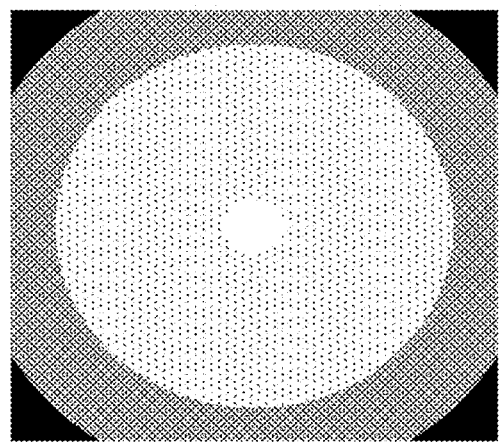
FIG. 9 illustrates figures of a plurality of first holes in a case of including an optical blur.

When an image of the angular measurement plate 101 (the second member 104) is captured by the stereo camera 10 (the first camera 1) in the case where the first interval a1 is smaller than the pixel pitch, the image is as illustrated in FIG. 8. However, the first interval a1, even when being equal to or less than 2 millimeters, comes to exceed the resolution limit in reality due to an influence of characteristics of a pixel aperture, a blur of an image forming optical system, and an optical blur of an optical LPF (Low Pass Filter) and the like in the case of a color camera. On the image, individual first holes 100 cannot be distinguished and figures of the first holes 100 included in the image present one big bell-shaped distribution in brightness (brightness distribution) as illustrated in FIG. 9. The top of the bell-shaped distribution in brightness in FIG. 9 corresponds to the vicinity of the first hole 106 in FIG. 6, for example. The fringe of the bell-shaped distribution in brightness in FIG. 9 corresponds to the vicinity of the first hole 108 in FIG. 6, for example.

Figure 10:
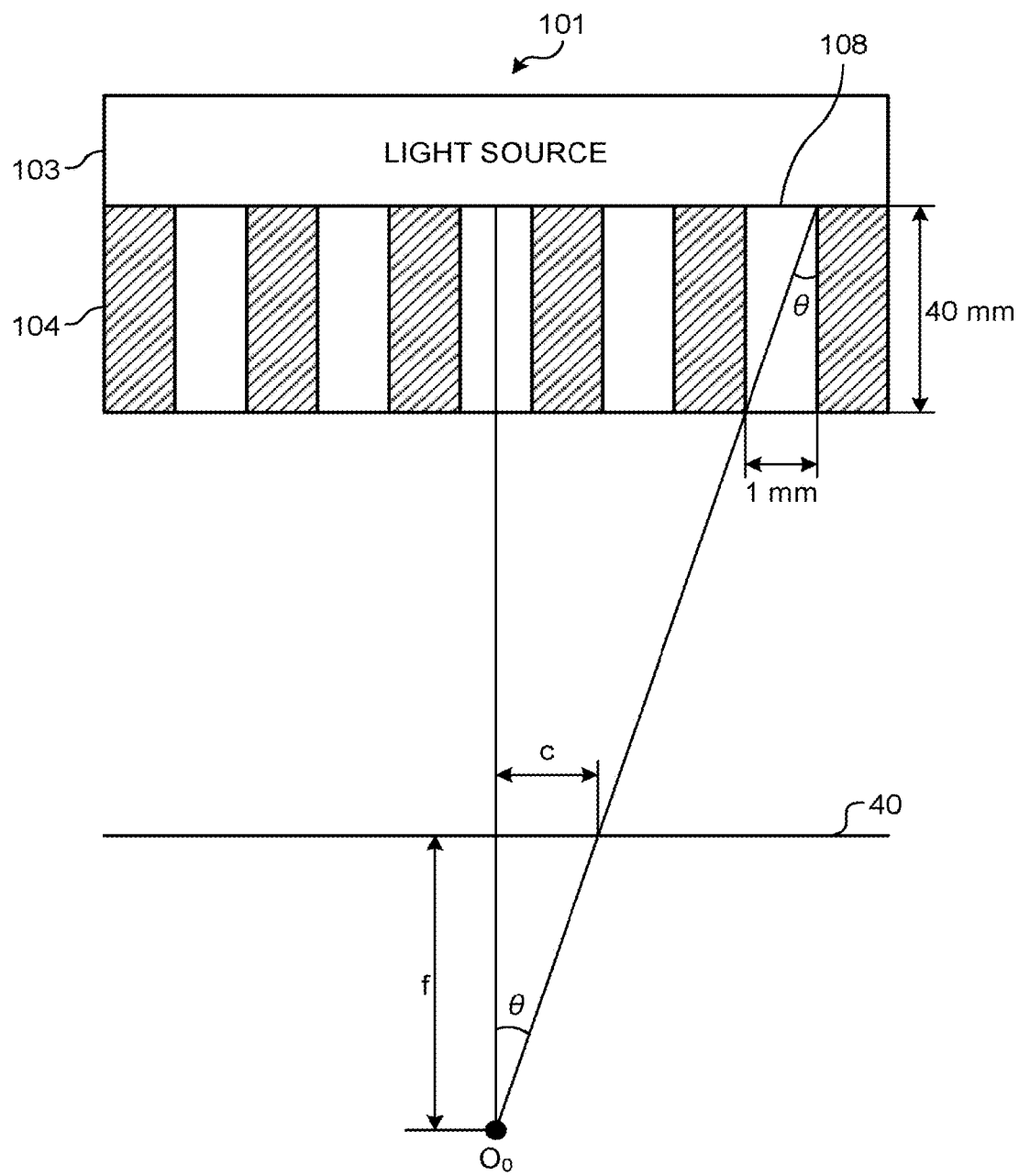
FIG. 10 is an explanatory view of a size of a radius of the fringe of a bell-shaped distribution in brightness in FIG. 9.

FIG. 10 is an explanatory view of a size of a radius c of the fringe of the bell-shaped distribution in brightness in FIG. 9. The thickness of the second member 104 is 40 millimeters and the diameter of the first hole 108 is 1 millimeter. Besides, the (semi) viewing angle of the stereo camera 10 (the first camera 1) is 20 degrees and the pixel sensor has 640×480 pixels. On this occasion, the radius c of the fringe of the bell-shaped distribution in brightness on an imaging surface 40 is approximately 22 pixels based on the following Expression (3).

$$c = f/40 \times 1 = 320/\tan(20[\deg])/40 \approx 22 \qquad (3)$$

By considering not the individual figures of the first holes 100 in FIG. 10 but the big bell-shaped distribution of consecutive brightness of the averaged individual figures, it is possible to grasp the position of the peak brightness as the direction perpendicular to the surface of the angular measurement plate 101 even in the situation where a position at which the optical center $O_0$ of the stereo camera 10 (the first camera 1) is not immediately above the first hole 100 corresponds to the direction perpendicular to the surface of the angular measurement plate 101. It is thus possible to recognize that the position of the peak brightness in the bell-shaped distribution in brightness (brightness distribution) of the image capturing the angular measurement plate 101 indicates the direction perpendicular to the surface of the angular measurement plate 101 regardless of the position of the optical center $O_0$ of the stereo camera 10 (the first camera 1).

Here, it is possible to accurately estimate the position of the peak brightness by approximating the entirety of the bell-shaped distribution in brightness by a function, e.g., a Gaussian function ($\exp(-r^2)$), estimating an average distribution of a large number of pixel values, and thereby reducing an influence of a random noise included in each of the pixel values.

Next, an intended purpose of the second holes 120 will be explained.

Figure 11:
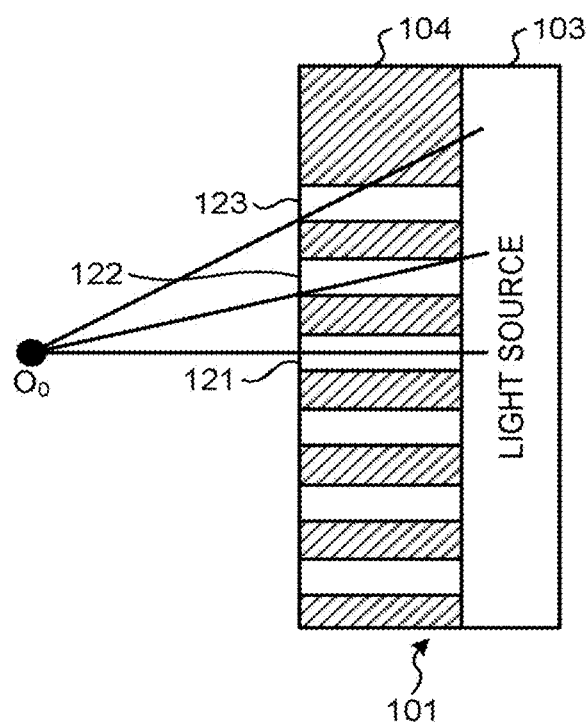
FIG. 11 is an explanatory view of a case where second holes 121, 122, and 123 bored in the second member are seen from the position at the optical center of the first camera.
Figure 12A:
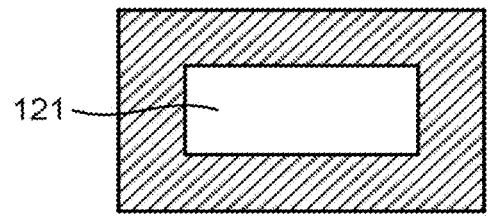
FIG. 12A illustrates a shape of the second hole 121 when the second hole 121 is seen from the position at the optical center of the first camera.
Figure 12B:
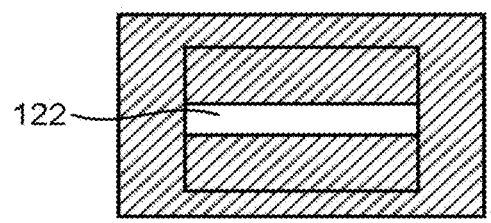
FIG. 12B illustrates a shape of the second hole 122 when the second hole 122 is seen from the position at the optical center of the first camera.
Figure 12C:
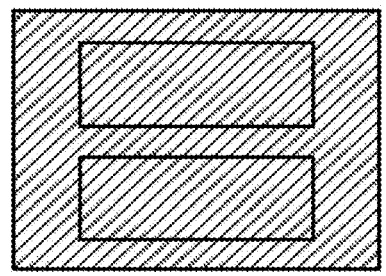
FIG. 12C illustrates a shape of the second hole 123 when the second hole 123 is seen from the position at the optical center of the first camera.

FIG. 11 is an explanatory view of a case where second holes 121, 122, and 123 bored in the second member 104 are seen from the position at the optical center $O_0$ of the first camera 1. Since the line of sight from the position at the optical center $O_0$ and the surface of the second member 104 are at right angles to each other at the position of the second hole 121, the light of the light source 103 behind the second member 104 is seen in a shape illustrated in FIG. 12A. Since the line of sight from the position at the optical center $O_0$ goes into the second hole 122 of the second member 104 at an angle at the position of the second hole 122, the light of the light source 103 behind the second member 104 is seen in a shape illustrated in FIG. 12B. Since the line of sight from the position at the optical center $O_0$ does not go into the second hole 123 of the second member 104 at the position of the second hole 123, the light of the light source 103 behind the second member 104 comes to be invisible (FIG. 12C).

In the case that "second interval a2>first interval a1" is satisfied, an angle until the light becomes invisible is larger in the second hole 120. In other words, while a range of a detection angle is larger in the second hole 120 in trying to know a change in angle by grasping a change in light amount, an amount of variation per angle becomes small and therefore the first hole 100 serves more in favor of a detection of angle by smaller unit.

Figure 13:
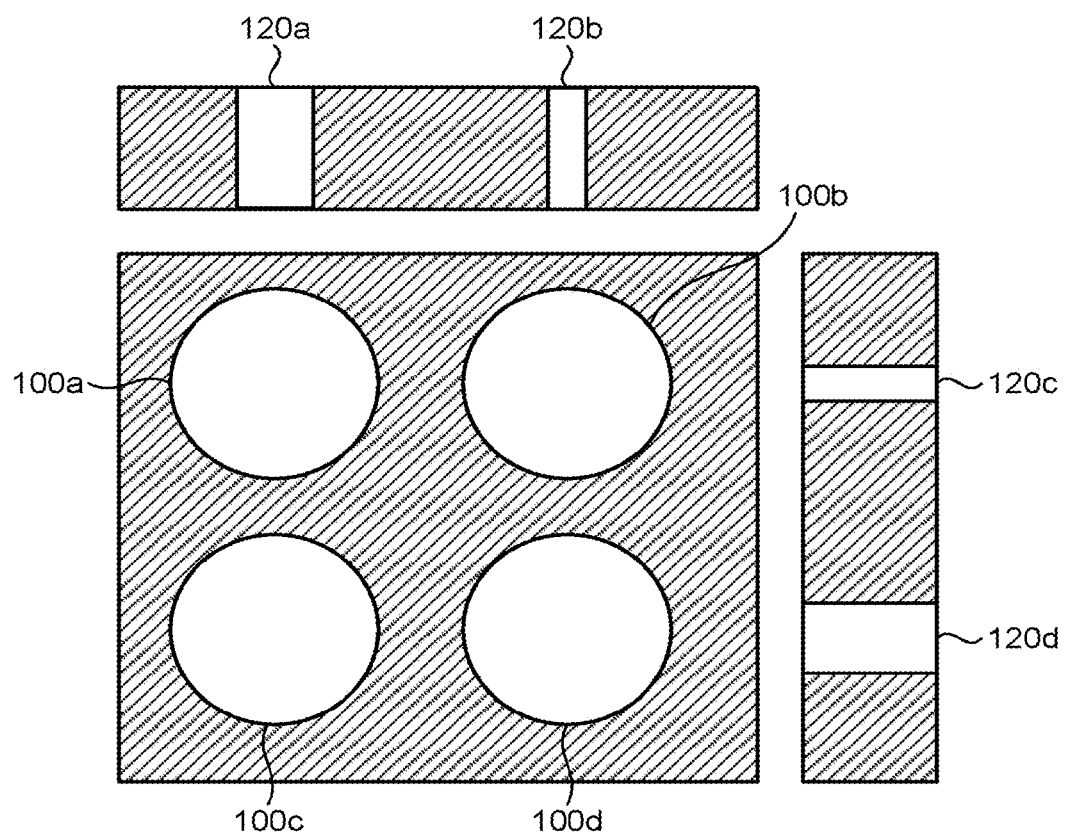
FIG. 13 is a conceptual diagram for explaining an intended purpose of the second holes according to the first embodiment.

FIG. 13 is a conceptual diagram for explaining the intended purpose of the second holes 120 according to the first embodiment. FIGS. 100*a*, 100*b*, 100*c*, and 100*d* of the first holes 100 present the brightness peak in the figures of the first holes 100. In this manner, when a plurality of peaks in brightness are present in the figures of the first holes 100 in the image, it becomes impossible to determine what peak in brightness indicates the actual perpendicular direction (the direction which is directly facing the stereo camera 10).

So, it is configured to determine the actual perpendicular direction depending on the position of the peak brightness in the figures formed by the second holes 120 which are provided with the second interval a2 larger than the first interval a1 and whose size is larger than the first hole 100. In the example in FIG. 13, it becomes possible by FIGS. 120*a*, 120*b*, 120*c*, and 120*d* of the second holes 120 to determine the position of the peak brightness of the first holes 100 based on the striped pattern formed at the upper end part and the right end part of the image. In other words, the FIG. 120*a* of the second hole 120 indicates the position of the peak brightness among the figures of the first holes 100 in the horizontal direction and the FIG. 120*d* of the second hole 120 indicates the position of the peak brightness among the figures of the first holes 100 in the vertical direction. It thus becomes possible to determine that the FIG. 100*c* of the first hole 100 indicates the actual perpendicular direction.

Here, the case where a plurality of peaks in brightness in the first holes 100 are present on the image is, for example, a case where the figure of the first hole 100 is repeated periodically due to an occurrence of a moire phenomenon in the figure of the first hole 100. The case where the moire phenomenon occurs in the peak brightness of the first hole 100 will be explained in the second embodiment.

Next, a relation of the position of the peak brightness in the figure of the first hole 100 and the inclination of the angular measurement plate 101 will be explained.

Figure 14:
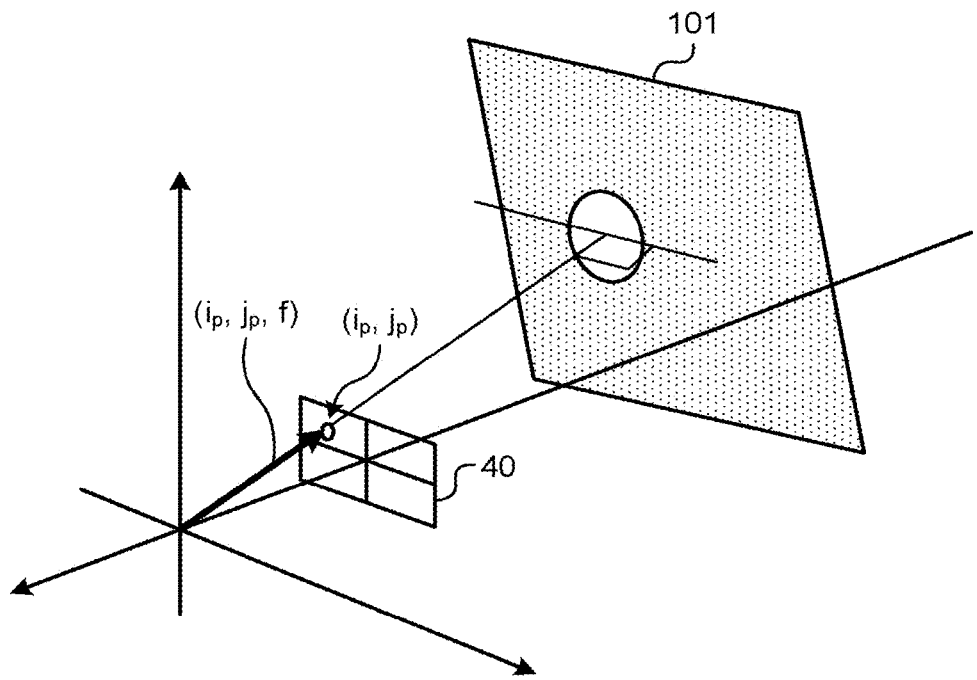
FIG. 14 is an explanatory view of a relation of a position of peak brightness in figures of the first holes on an imaging surface and an inclination of the angular measurement plate.

FIG. 14 is an explanatory view of a relation of the position of the peak brightness in the figure of the first hole 100 on the imaging surface 40 and an inclination of the angular measurement plate 101. The coordinates of the imaging surface 40 are expressed in the unit of pixels by setting the center of the imaging surface 40 as the origin. On this occasion, coordinates $(i_p, j_p)$ of the position of the peak brightness on the imaging surface 40 (image) indicate the position of the foot of the perpendicular lien from the optical center $O_0$ of the stereo camera 10 (the first camera 1) to the angular measurement plate 101. Therefore, if the angular measurement plate 101 faces the stereo camera 10 (the first camera 1) directly in front to each other, i.e., if a normal line with respect to the surface of the measurement tool 20 and the optical axis of the stereo camera 10 (the first camera 1) are parallel, the position of the peak brightness is supposed to be the center (origin) of the image. In other words, when the position $(i_p, j_p)$ of the peak brightness is displaced from the center (origin) of the image, it is possible based on the coordinates $(i_p, j_p)$, indicating the position of the peak brightness, of the image (the imaging surface 40) to grasp an angle indicating a displacement in the horizontal direction and an angle indicating a displacement in the vertical direction of the measurement tool 20 with inclination with respect to the proper direction. Specifically, when a focal length (pixel unit) of the stereo camera 10 (the first camera 1) is set as f, it is possible to determine the direction of the normal line of the angular measurement plate 101 based on $(i_p, j_p, f)$. In other words, it is possible to grasp an orientation of the stereo camera 10 (the first camera 1) to directly face the angular measurement plate 101 which is arranged with inclination with respect to the directly facing direction.

Figure 15:
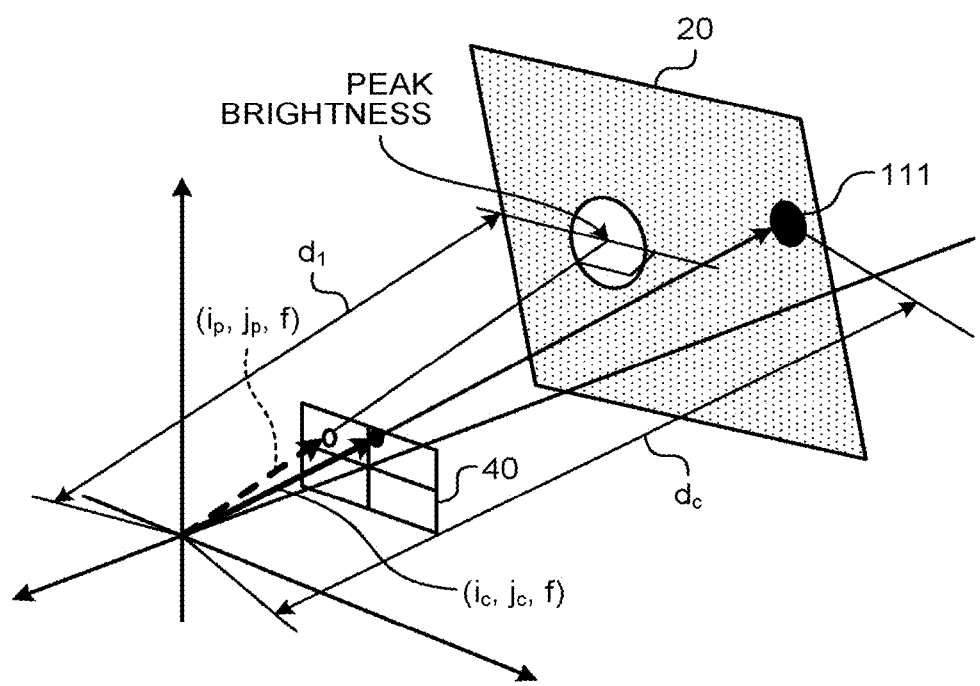
FIG. 15 is an explanatory view of a method of determining an equation of a plane indicating the position of the measurement tool.

Next, a method of determining an equation of a plane indicating the position of the angular measurement plate 101 (the measurement tool 20) will be explained specifically. FIG. 15 is an explanatory view of the method of determining an equation of a plane indicating the position of the measurement tool 20. An equation of a plane expressing the measurement tool 20 on the coordinate system whose origin is the optical center $O_0$ of the stereo camera 10 (the first camera 1) is shown in Equation (4).

$$ax+by+cz+d=0 \quad (4)$$

The direction of the normal line of the angular measurement plate 101 can be expressed by $(i_p, j_p, f)$ as explained with reference to FIG. 14. Since the vector of the normal line of this plane can be determined by $(i_p, j_p, f)$, "(a, b, c)=$(i_p, j_p, f)$" is true. Then, the mark 111 of the measurement tool 20 (the first member 102) is measured by a laser distance meter and the like to determine a variable d of the equation of the plane, and the measured distance is set as $d_c$. Besides, coordinates indicating the position of the mark 111 on the image are set as $(i_c, j_c)$. When the focal length (pixel unit) of the stereo camera 10 (the first camera 1) is set as f, a point $(x_c, y_c, z_c)$ of the distance $d_c$ in the vector $(i_c, j_c, f)$ direction is equivalent to the coordinates indicating the position of the mark 111. In other words, coordinates $(x_c, y_c, z_c)$ indicating the position of the mark 111 on the plane can be calculated by the following Equation (5).

$$(x_c, y_c, z_c) = \frac{d_c}{\sqrt{i_c^2 + j_c^2 + f^2}} (i_c, j_c, f) \quad (5)$$

Thus, it is possible to determine the variable d of the equation of the plane by Equations (6) and (7) below. In the manner explained above, it is possible to determine the equation (a, b, c, d) of the plane expressing the measurement tool 20.

$$ax_c+by_c+cz_c+d=0 \quad (6)$$

$$d=-i_p x_c-j_p y_c-f z_c \quad (7)$$

While the angle indicating the displacement of the angular measurement plate 101 inclined in the horizontal direction and the angle indicating the displacement thereof inclined in the vertical direction can be calculated from the captured image of the angular measurement plate 101, it is impossible to grasp the distance to the angular measurement plate 101. Therefore, the position of the mark 111 on the image and the distance information $d_c$ to the mark 111 are used in the explanation above. Except for this method, a method of actually measuring a distance $d_1$ and the like in FIG. 15 is also available. Besides, if the accuracy in position of the measurement tool 20 is high (and the accuracy in angle thereof is low) with respect to an acceptable accuracy for the calibration of the stereo camera 10 (the first camera 1), a fixed value may be used as the distance information without actually measuring the distance between the mark 111 and the stereo camera 10.

Next, a configuration of the calibration apparatus 30 that calibrates the stereo camera 10 (the first camera 1) by using the method explained above according to the first embodiment will be explained.

Figure 16:
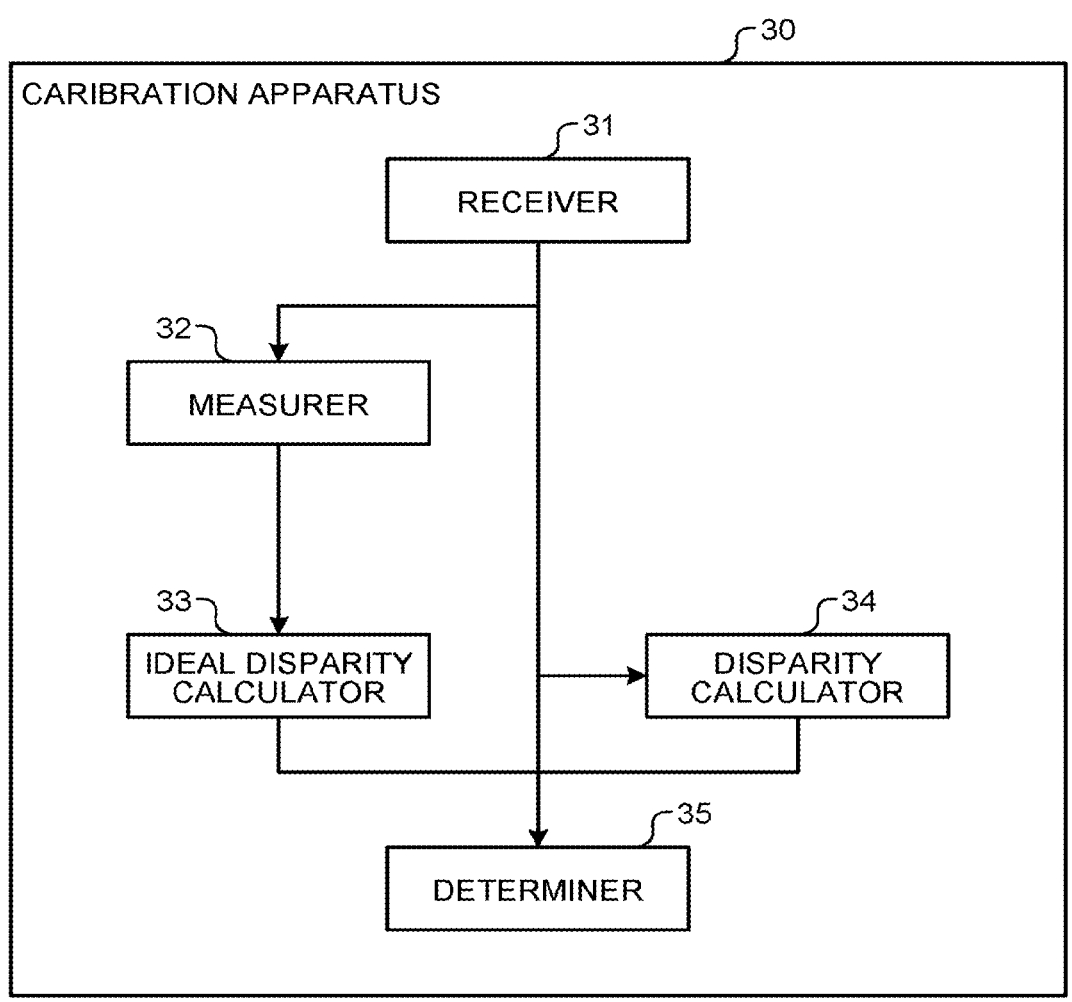
FIG. 16 illustrates an example of a configuration of the calibration apparatus according to the first embodiment.

FIG. 16 illustrates an example of a configuration of the calibration apparatus 30 according to the first embodiment. The calibration apparatus 30 according to the first embodiment is provided with a receiver 31, a measurer 32, an ideal disparity calculator 33, a disparity calculator 34, and a determiner 35.

The receiver 31 receives images including, as a subject, the measurement tool 20 captured by the stereo camera 10 (the first image captured by the first camera 1 and the second image captured by the second camera 2). The receiver 31 also receives the distance information $d_c$ (see FIG. 15) explained above. The receiver 31 inputs the first image and the distance information $d_0$ to the measurer 32. The receiver 31 also inputs the images (the first image and the second image) to the disparity calculator 34.

The measurer 32 receives the first image and the distance information $d_c$ from the receiver 31. The measurer 32 determines the direction (normal line vector) perpendicular to the surface of the measurement tool 20 (the angular measurement plate 101) based on the position of the maximum brightness in the first image in the method explained with reference to FIG. 14. The measurer 32 thus measures a displacement in orientation (the angle indicating a displacement inclined in the horizontal direction and the angle indicating a displacement inclined in the vertical direction) of the measurement tool 20 from the position which directly faces the stereo camera 10 (the first camera 1). Besides, the equation of the plane expressing the position of the measurement tool 20 in the first camera coordinate system (in the coordinate system whose origin is the optical center $O_0$ of the first camera 1) is determined based on the normal line vector and the distance information $d_c$ in the method explained with reference to FIG. 15. The measurer 32 inputs information indicating the equation of the plane to the ideal disparity calculator 33.

The ideal disparity calculator 33 receives the equation of the plane expressing the position of the measurement tool 20 from the measurer 32. The ideal disparity calculator 33 calculates an ideal disparity indicating a disparity in a case where an image of the plane expressed by the equation is captured in the method explained with reference to FIG. 3. The ideal disparity calculator 33 inputs the ideal disparity to the determiner 35.

The disparity calculator 34 receives the images (the first image and the second image) from the receiver 31. The disparity calculator 34 uses the shading pattern and the like of the measurement tool 20 (the first member 102), detects a point, corresponding to a point in the first image, in the second image, and calculates the disparity. The disparity calculator 34 inputs the disparity to the determiner 35.

The determiner 35 receives the ideal disparity from the ideal disparity calculator 33 and receives the disparity from the disparity calculator 34. The determiner 35 also receives the first image and the second image from the receiver 31. The determiner 35 determines a calibration parameter used for correcting the first image and the second image based on the disparity and the ideal disparity. The determiner 35 determines the calibration parameter used for correcting at least one of the first image and the second image so that the difference between the disparity and the ideal disparity becomes zero.

Next, an example of the calibration method according to the first embodiment will be explained.

Figure 17:
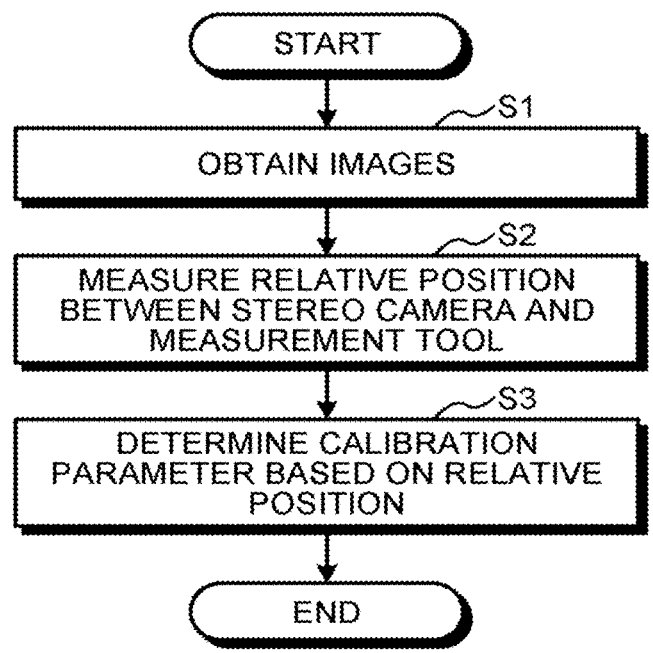
FIG. 17 is a flowchart of a simple overview of an example of a calibration method according to the first embodiment.

FIG. 17 is a flowchart of a simple overview of an example of the calibration method according to the first embodiment. First, the stereo camera 10 captures the images (the first image and the second image) including the measurement tool 20 as the subject (step S1).

Next, the calibration apparatus 30 measures a relative position between the stereo camera 10 and the measurement tool 20 (step S2). Specifically, the measurer 32 measures a displacement in the orientation of the measurement tool 20 from the position of directly facing the stereo camera 10 from the images (the first image and the second image). The receiver 31 receives the distance information $d_c$ (see FIG. 15).

The calibration apparatus 30 then determines the calibration parameter based on the relative position measured at step S2 (step S3).

FIG. 18 is a flowchart of an example of the calibration method according to the first embodiment. The receiver 31 receives the images (the first image and the second image) including the measurement tool 20 as the subject (step S11). The receiver 31 also receives the distance information $d_c$ (step S12).

Next, the measurer 32 measures a displacement in the orientation of the measurement tool 20 from the position of directly facing the stereo camera 10 (step S13). Specifically, the measurer 32 specifies the position of a maximum brightness (peak brightness) in the figures of the plurality of first holes 100 included in the first image based on the position of a maximum brightness in figures of the plurality of second holes 120 included in the first image. The measurer 32 then specifies the direction (normal line vector) perpendicular to the face of the measurement tool 20 (the angular measurement plate 101) based on the specified position of the maximum brightness in the figures of the plurality of first holes 100 to measure the displacement in the orientation of the measurement tool 20 from the directly facing position with the stereo camera 10 (see FIG. 14).

Next, the measurer 32 determines the equation of the plane expressing the position of the measurement tool 20 in the first camera coordinate system (in the coordinate system whose origin is the optical center $O_0$ of the first camera 1) based on the normal line vector and the distance information $d_c$ in the method explained with reference to FIG. 15 (step S14).

Next, the ideal disparity calculator 33 calculates the ideal disparity indicating the disparity in the case where an image of the plane expressed by the equation determined at step S14 is captured in the method explained with reference to FIG. 3 (step S15). Next, the disparity calculator 34 calculates the disparity by using the shading pattern and the like of the measurement tool 20 (the first member 102) and detecting a point, corresponding to a point in the first image, in the second image (step S16).

Next, the determiner 35 determines the calibration parameter used for correcting at least one of the first image and the second image based on the disparity and the ideal disparity (step S17). The determiner 35 determines the calibration parameter used for correcting at least one of the first image and the second image so that the difference between the disparity and the ideal disparity becomes zero.

As explained above, the measurer 32 specifies the position of the maximum brightness in the figures of the first holes 100 based on the position of the maximum brightness in the figures of the plurality of second holes 120 included in the first image in the calibration method according to the first embodiment. The measurer 32 then measures the displacement in the orientation of the measurement tool 20 from the directly facing position with the stereo camera 10 based on the position of the maximum brightness in the figures of the first holes 100. The determiner 35 determines the calibration parameter used for correcting the stereo camera 10 based on the disparity calculated from the first image and the second image and the ideal disparity in which the displacement in the orientation of the measurement tool 20 is taken into consideration. It is thus possible to easily calculate a highly accurate calibration parameter with respect to the in-vehicle stereo camera 10 which is of difficulty in securing the accuracy in installation position.

Second Embodiment

A second embodiment will be explained next. In the second embodiment, a case of using a measurement tool 20 provided with an angular measurement plate 201 having a structure different from the angular measurement plate 101 according to the first embodiment will be explained. The same explanation as the first embodiment will be omitted and a part different from the first embodiment will be explained in the explanation of the second embodiment.

The structure of the angular measurement plate 201 according to the second embodiment will be explained. The explanation of the front view of the angular measurement plate 201 according to the second embodiment will be omitted since being the same as the first embodiment (see FIG. 5A).

Figure 19A:
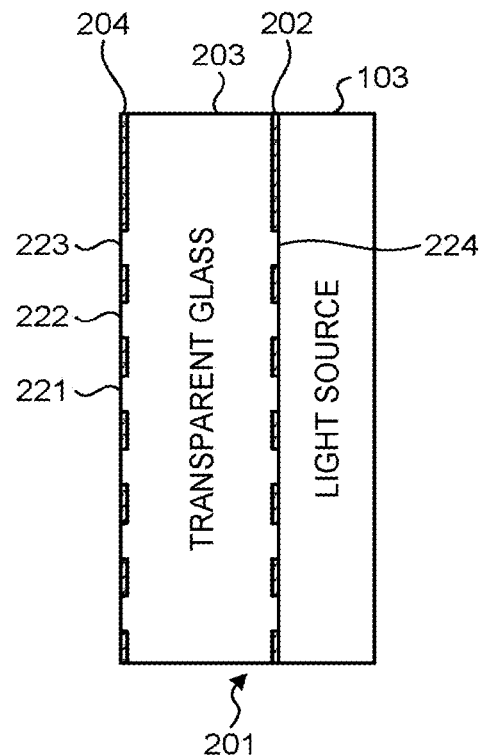
FIG. 19A is a cross sectional view taken along line A-A of an angular measurement plate according to a second embodiment.
Figure 19B:
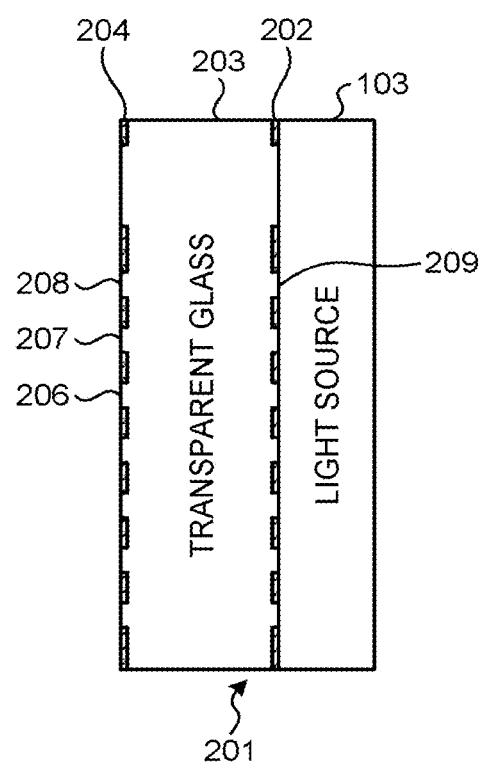
FIG. 19B is a cross sectional view taken along line B-B of the angular measurement plate according to the second embodiment.

FIG. 19A is a cross sectional view taken along line A-A of the angular measurement plate 201 according to the second embodiment. FIG. 19B is a cross sectional view taken along line B-B of the angular measurement plate 201 according to the second embodiment. The angular measurement plate 201 is provided with the light source 103, a light shielding plate 202, a transparent glass 203, and a light shielding plate 204. The light source 103 is the same as the first embodiment and the explanation thereof will be omitted. The light shielding plate 202, the transparent glass 203, and the light shielding plate 204 correspond to the second member 104 according to the first embodiment.

The angular measurement plate 201 according to the second embodiment uses a transparent glass plate in which an opaque light-shielding area (the light shielding plates 202 and 204) is arranged on both surfaces. The transparent glass 203 is arranged to fix the position of the light shielding plates 202 and 204. It is possible, by filling a gap between the light shielding plates 202 and 204 with glass, to realize robustness against a mechanical displacement and to reduce measurement errors due to a temperature, a temporal deformation, and the like. Here, the transparent glass 203 may be any arbitrary transparent material.

The angular measurement plate 201 according to the second embodiment is the same as the angular measurement plate 101 according to the first embodiment in that the light incident to the direction nearly perpendicular to the angular measurement plate 201 passes through facing holes (second holes 223 and 224 in FIG. 19A and first holes 208 and 209 in FIG. 19B, for example). However, since the light becomes refracted on a boundary surface between the transparent glass 203 and the air, the brightness distribution in the image is different from the first embodiment.

Figure 20:
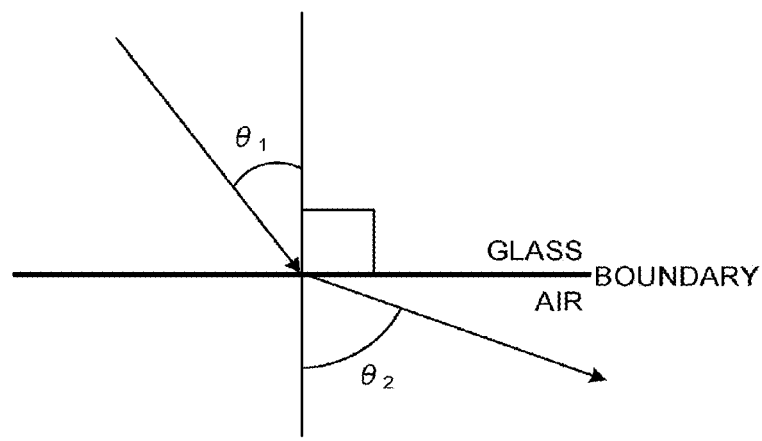
FIG. 20 is an explanatory view about an angle of refraction of light.

FIG. 20 is an explanatory view about an angle of refraction of light. As is known (the Snell's law), the outgoing direction of the transmitted light changes due to the refraction on the boundary surface between the glass and the air. When a specific refractive index is set as R, the relation between angles $\theta_1$ and $\theta_2$ in FIG. 20 is indicated by the following Equation (8).

$$\frac{\sin(\theta_1)}{\sin(\theta_2)} = R \qquad (8)$$

Thus, if the total thickness of the light shielding plate 202, the transparent glass 203, and the light shielding plate 204, and the hole diameter are the same as those of the second member 104 according to the first embodiment, the figure of a farther hole comes to be visible because of the refraction by the glass (see FIG. 20). Therefore, the size of the fringe of the bell-shaped distribution in brightness in the image becomes larger than the first embodiment. However, the nature that the position of the peak brightness in the figures of the plurality of first holes 100 corresponds to the direction of the normal line of the light shielding plate 204 regardless of the position at the optical center $O_0$ of the stereo camera 10 (the first camera 1) is common.

Figure 21:
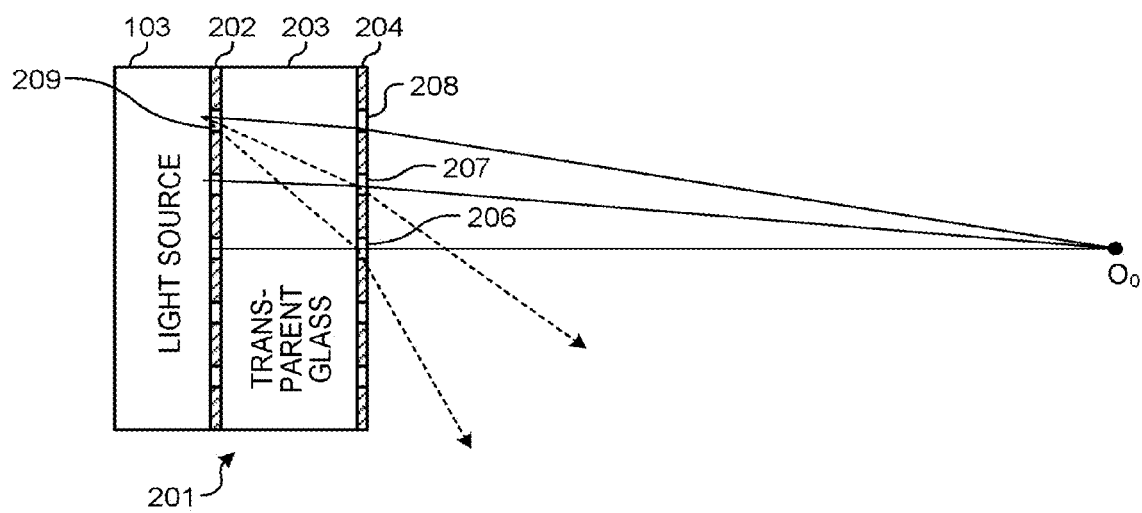
FIG. 21 is an explanatory view about a light radiated from the first holes according to the second embodiment.

In the angular measurement plate 201 according to the second embodiment, which is different from the angular measurement plate 101 according to the first embodiment, even light passing through a hole, which is not facing to each other, in the direction indicated by a dotted line in FIG. 21 except for the front-side direction is transmitted. In a first hole 207, for example, light from a first hole 209 that faces a first hole 208 is transmitted from the first hole 207 because of the influence of the refraction.

Therefore, a moire pattern in which light and dark are repeated periodically is observed in the image capturing the angular measurement plate 201, which is different from the case of the first embodiment. There is therefore a possibility that a plurality of peaks in brightness are present in the figures of the plurality of first holes 100 on the image. However, it is possible also in the angular measurement plate 201 according to the second embodiment to easily specify the position of the peak brightness in the figures of the plurality of first holes 100 based on the position of the peak brightness in the figures of the plurality of second holes 120 on the image, similarly to the case of the first embodiment.

Here, if the accuracy in the installation angle of the stereo camera 10 (the first camera 1) and the measurement tool 20 is known, it is possible by taking the moire period corresponding to a moving range of the position of the peak brightness in the figures of the first holes 100 depending on the range of the displacement in installation into consideration to avoid mistaking the position of the peak brightness in the figure of the directly facing first hole 100 for the peak brightness corresponding to the figure of an adjacent first hole 100.

Here, a case of determining the first interval a1 of the first holes 100 by taking the moire period into consideration will be explained.

Figure 22:
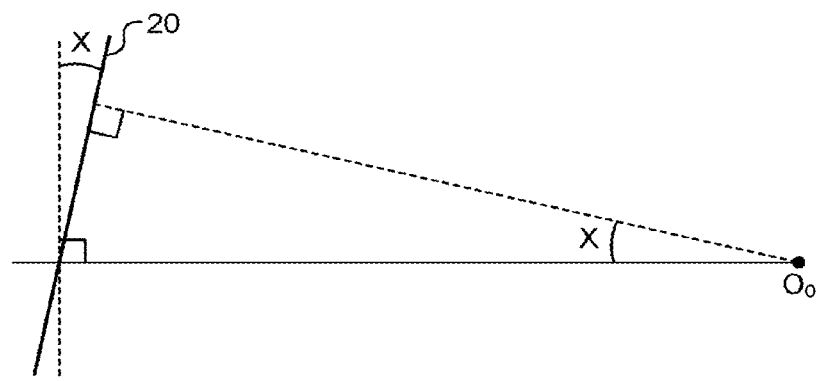
FIG. 22 is an explanatory view about a relation of an inclination of the measurement tool and a displacement in position of peak brightness in the figures of the plurality of first holes.
Figure 23:
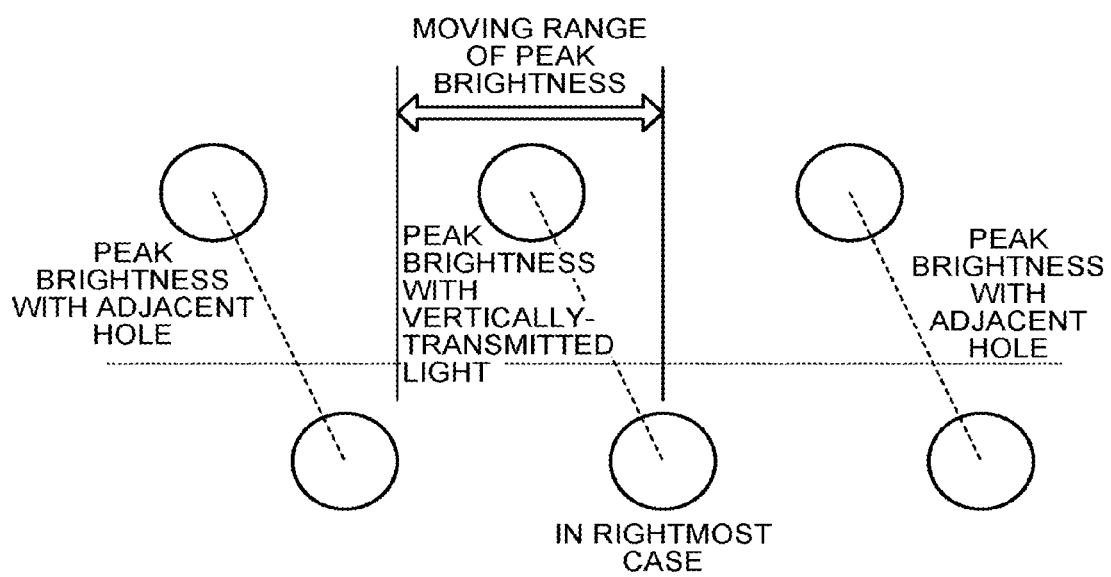
FIG. 23 is an explanatory view about a relation of a moire period and a moving range of the peak brightness in the figures of the first holes.
Figure 24:
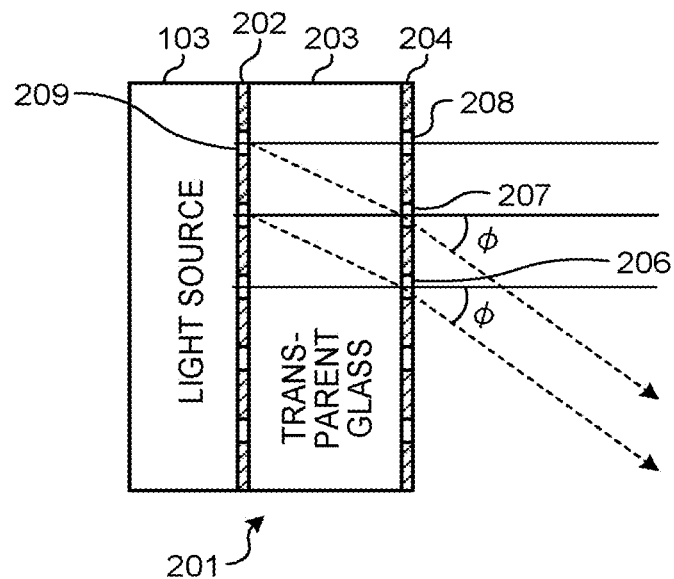
FIG. 24 is an explanatory view about the position of the peak brightness in the figures of adjacent first holes.

FIG. 22 is an explanatory view about a relation of the inclination of the measurement tool 20 and the displacement in position of the peak brightness in the figures of the plurality of first holes 100. FIG. 23 is an explanatory view about a relation of the moire period and the moving range of the peak brightness in the figures of the first holes 100. As illustrated in FIG. 22, in a case where the installation angle of the measurement tool 20 has a displacement in angle of not more than ±X degrees from the directly facing direction, the position of the peak brightness in the figures of the plurality of first holes 100 is also present within a range of not more than the X degrees from the directly facing position (center in the screen). In other words, it is only necessary to adjust the first interval a1 of the first holes 100 so that the peak brightness of an adjacent first hole 100 comes to be present at a position not less than two times as far away as the estimated displacement in position of the peak brightness, as illustrated in FIG. 23. The position of the peak brightness of the adjacent first hole 100 is determined by an angle $\Phi$ in FIG. 24 (to be precise, focal length f×tan($\Phi$)), and the angle $\Phi$ has a relation shown in Equation (9) below, with a hole pitch (p) on a light shielding surface, a thickness of the glass plate (d), and a refractive index of the glass (n).

$$\frac{\sin(\Phi)}{\sin(\arctan(p/d))} = n \qquad (9)$$

Based on Equation (9), it is only necessary that the thickness of the glass plate (d) and the hole pitch (p) are determined to satisfy Equation (10) below, the thickness of the glass (d) is applied as the thickness of the transparent glass 203, and the hole pitch (p) is applied as the first interval a1 of the first holes 100.

$$\Phi = \arcsin(n \sin(\arctan(p/d))) > 2X \qquad (10)$$

In the explanation above, the position of the peak brightness of the adjacent first hole 100 is estimated by taking only the accuracy of the installation angle into consideration. However, it is in fact necessary to estimate a range of the presence of the peak brightness indicating the directly facing position by taking all the presumable installation displacements such as the installation angle of the stereo camera 10, the translational displacement of the measurement tool 20, and the translational displacement of the stereo camera 10, other than the installation angle of the measurement tool 20, into consideration. Then, it is possible to uniquely determine the position of the peak brightness within the estimated range for a hole directly facing the stereo camera 10 by determining the thickness of the glass plate (d) and the hole pitch (p) so that the peak brightness of the adjacent first hole 100 is not within the estimated range of the peak brightness.

In this manner, it often takes a lot of trouble to determine the first interval a1 of the first holes 100 by estimating the position of the peak brightness of the adjacent first hole 100. However, it becomes possible by reference to the position of the peak brightness in the figures of the plurality of second holes 120 on the image to easily specify the position of the peak brightness in the figures of the plurality of first holes 100 regardless of the first interval a1.

In generating the light shielding plate 202 (204), techniques such as printing and a photo-etching can be used for a method of forming a light shielding area on a flat plate. In the techniques, it is generally easy to realize a hole whose diameter is small and to realize a narrow pitch compared with the second member 104, which is generated in the method of boring a hole in a thick plate with a drill and the like, according to the first embodiment. The size of the mountain-shaped distribution in brightness is determined by a ratio (and a refractive index) between the hole diameter and the plate thickness. For example, the plate thickness (total thickness of the light shielding plate 202, the transparent glass 203, and the light shielding plate 204) is 6 millimeters and the radius of the first hole 100 is 0.05 millimeter, which allows obtaining almost the same brightness distribution as the case of the first embodiment.

As explained so far, it is possible in the measurement tool 20 according to the second embodiment to realize the calibration accuracy equivalent to the angular measurement plate 101 according to the first embodiment even by making the angular measurement plate 201 lighter, smaller, and thinner than the angular measurement plate 101 according to the first embodiment.

Here, simply for the purpose of only shielding a light, the light shielding plates 202 and 204 may be arranged at the same position as the light shielding area of the both surfaces of the glass without arranging the transparent glass 203.

Finally, an example of a hardware configuration of the calibration apparatus 30 according to the first and the second embodiments will be explained.

Figure 25:
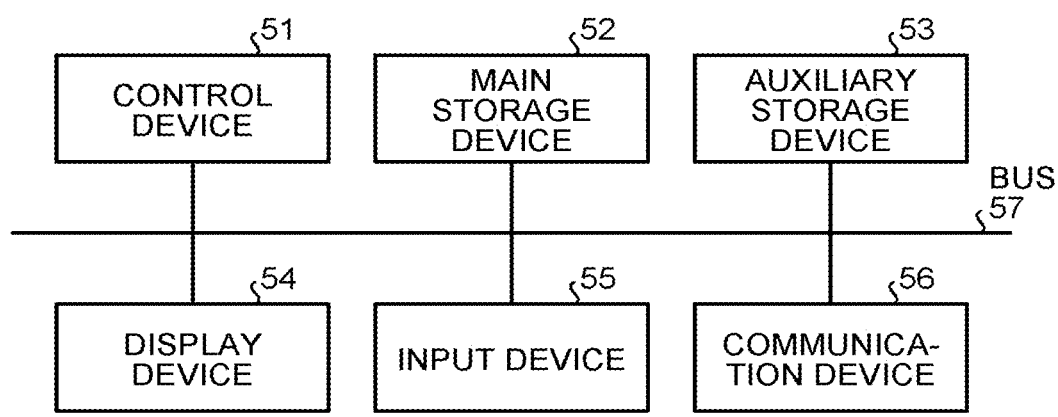
FIG. 25 is an explanatory view of an example of a hardware configuration of the calibration apparatus according to the first and the second embodiments.

FIG. 25 illustrates an example of a hardware configuration of the calibration apparatus 30 according to the first and the second embodiments. The calibration apparatus 30 according to the first and the second embodiments is provided with a control device 51, a main storage device 52, an auxiliary storage device 53, a display device 54, an input device 55, and a communication device 56. The control device 51, the main storage device 52, the auxiliary storage device 53, the display device 54, the input device 55, and the communication device 56 are connected to each other via a bus 57.

The control device 51 executes a program read out from the auxiliary storage device 53 to the main storage device 52. The main storage device 52 is a memory such as a ROM and a RAM. The auxiliary storage device 53 is an HDD (Hard Disk Drive), a memory card, and the like. The display device 54 displays a status of the calibration apparatus 30 and the like. The input device 55 receives an input by a user. The communication device 56 is an interface that enables a connection to a network.

The program to be executed in the calibration apparatus 30 according to the first and the second embodiments is provided by being stored in a file of an installable format or of an executable format in a computer-readable recording medium such as a CD-ROM, a memory card, a CD-R, and a DVD (Digital Versatile Disk) as a computer program product.

The program to be executed in the calibration apparatus 30 according to the first and the second embodiments may be provided by being stored on a computer connected to a network such as the Internet and downloaded via the network. The program to be executed in the calibration apparatus 30 according to the first and the second embodiments may be provided via a network such as the Internet without being downloaded.

The program to be executed in the calibration apparatus 30 according to the first and the second embodiments may be provided by being preloaded in a ROM and the like.

The program to be executed in the calibration apparatus 30 according to the first and the second embodiments has a module configuration including the functional blocks (the receiver 31, the measurer 32, the ideal disparity calculator 33, the disparity calculator 34, and the determiner 35) explained above.

As an actual hardware, those functional blocks are loaded on the main storage device 52 when the control device 51 reads out from the storage medium and executes the program. In other words, those functional blocks are generated on the main storage device 52.

Besides, a part or all of the functional blocks may be realized by hardware such as an IC (Integrated Circuit) without realizing them by software.

While the case of the stereo camera 10 equipped in an automobile is taken as an example in the first and the second embodiments, the present invention is not limited to the embodiments. In a case of requiring a measurement of an accurate installation position of the stereo camera 10 and taking much time in the measurement and the like, it is possible by using the measurement tool 20 according to the first and the second embodiments to correct the stereo camera 10 with high accuracy in a relatively easy manner compared with the conventional calibration methods.

According to an embodiment of the present invention, there is provided an advantage of calibrating a stereo camera with higher accuracy.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A measurement tool comprising
a first member having a surface including a chart to be used for calibration of a stereo camera; and
a measurement member arranged on the surface of the first member, wherein
the measurement member includes
a light source configured to emit light with a uniform intensity regardless of a position on the surface,
a second member configured to cover the light source and radiate the light from a plurality of first holes and a plurality of second holes having a size larger than the first hole,
the second member includes two flat plates which are parallel to each other and in which the plurality of first holes that are bored in the direction perpendicular to the surface are provided at first intervals and the plurality of second holes that are bored in the direction perpendicular to the surface are provided at second intervals,
the first holes are located at same positions on the surface in the respective two flat plates, and
the second holes are located at same positions on the surface in the respective two flat plates.

2. The measurement tool according to claim 1, wherein the two flat plates are fixed by a transparent material between the two flat plates.

3. The measurement tool according to claim 1, wherein the first interval is not more than a resolution limit of the stereo camera in a calibration distance between the stereo camera and the measurement tool.

4. The measurement tool according to claim 1, wherein
each of the second holes has a rectangular shape, and
the second holes are bored at the second intervals in at least one of an upper end part and a lower end part of the second member in a horizontal direction and in at least one of a right end part and a left end part of the second member in a vertical direction.

5. A calibration method of calibrating a stereo camera by a measurement tool that includes a first member having a surface including a chart to be used for calibration of a stereo camera, and a measurement member arranged on the surface of the first member, the measurement member including a light source configured to emit light with a uniform intensity regardless of a position on the surface, and a second member configured to cover the light source and radiate the light from a plurality of first holes and a plurality of second holes having a size larger than the first hole, the calibration method comprising the steps of:
obtaining a captured image that includes, as a subject, the measurement tool captured by the stereo camera;
specifying a position of a maximum brightness in figures of the plurality of first holes included in the captured image based on a position of a maximum brightness in figures of the plurality of second holes included in the captured image, and measuring a displacement in an orientation of the measurement tool from a directly facing position with the stereo camera based on the specified position of the maximum brightness in the figures of the plurality of first holes; and
determining a calibration parameter for calibrating the stereo camera based on the displacement in the orientation of the measurement tool and the captured image.

6. The calibration method according to claim 5, wherein the step of determining includes the steps of
calculating a disparity of the chart from the captured image;
calculating an ideal disparity in which the displacement in the orientation of the measurement tool is taken into consideration; and
determining the calibration parameter for calibrating the stereo camera based on the disparity and the ideal disparity.

7. A non-transitory computer-readable recording medium with an executable program stored thereon, wherein the program instructs a computer to perform the calibration method according to claim 5.

8. A calibration apparatus comprising:
a receiver configured to receive a captured image that is captured by a stereo camera, the captured image including, as a subject, a measurement tool that includes a first member having a surface including a chart to be used for calibration of the stereo camera, and a measurement member arranged on the surface of the first member, the measurement member including a light source configured to emit light with a uniform intensity regardless of a position on the surface, and a second member configured to cover the light source and radiate the light from a plurality of first holes and a plurality of second holes having a size larger than the first hole;

a measurer configured to specify a position of a maximum brightness in figures of the plurality of first holes included in the captured image based on a position of a maximum brightness in figures of the plurality of second holes included in the captured image and to measure a displacement in an orientation of the measurement tool from a directly facing position with the stereo camera based on the specified position of the maximum brightness in the figures of the plurality of first holes; and a determiner configured to determine a calibration parameter for calibrating the stereo camera based on the displacement in the orientation of the measurement tool and the captured image.

* * * * *